US010621446B2

(12) United States Patent
Garud et al.

(10) Patent No.: US 10,621,446 B2
(45) Date of Patent: Apr. 14, 2020

(54) HANDLING PERSPECTIVE MAGNIFICATION IN OPTICAL FLOW PROCESSING

(71) Applicant: Texas Instruments Incorporated, Dallas, TX (US)

(72) Inventors: Hrushikesh Tukaram Garud, Parbhani (IN); Manu Mathew, Bangalore (IN); Soyeb Noormohammed Nagori, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 119 days.

(21) Appl. No.: 15/684,321

(22) Filed: Aug. 23, 2017

(65) Prior Publication Data
US 2018/0181816 A1    Jun. 28, 2018

(30) Foreign Application Priority Data

Dec. 22, 2016    (IN) ............................. 201641043792

(51) Int. Cl.
*G06K 9/00*    (2006.01)
*H04N 19/20*    (2014.01)
(Continued)

(52) U.S. Cl.
CPC ..... *G06K 9/00791* (2013.01); *G06K 9/00973* (2013.01); *G06K 9/46* (2013.01);
(Continued)

(58) Field of Classification Search
CPC .. G06K 9/00791; G06K 9/00973; G06K 9/46; G06K 9/6215; G06K 2009/3291;
(Continued)

(56) References Cited

U.S. PATENT DOCUMENTS 5,577,130 A * 11/1996 Wu ........................ G06K 9/20
                                                                382/106
5,790,206 A *  8/1998 Ju ........................ H04N 19/53
                                                                348/699

(Continued)

OTHER PUBLICATIONS

David Hafner, et al, "Why is the Census Transform Good for Robust Optic Flow Computation?" International Conference on Scale Space and Variational Methods in Computer Vision, in A Kuijper, et al (Eds.): Scale-Space and Variational Methods in Computer Vision, Lecture Notes in Computer Science, vol. 7893, pp. 210-221, Springer, Berlin, 2013.

(Continued)

*Primary Examiner* — Manav Seth
(74) *Attorney, Agent, or Firm* — Ebby Abraham; Charles A. Brill; Frank D. Cimino (57) ABSTRACT

A method of optical flow estimation is provided that includes identifying a candidate matching pixel in a reference image for a pixel in a query image, determining a scaled binary pixel descriptor for the pixel based on binary census transforms of neighborhood pixels corresponding to scaling ratios in a set of scaling ratios, determining a scaled binary pixel descriptor for the candidate matching pixel based on binary census transforms of neighborhood pixels corresponding to scaling ratios in the set of scaling ratios, and determining a matching cost of the candidate matching pixel based on the scaled binary pixel descriptors.

19 Claims, 8 Drawing Sheets

(51) Int. Cl.

| | |
|---|---|
| *H04N 19/513* | (2014.01) |
| *H04N 19/523* | (2014.01) |
| *H04N 19/53* | (2014.01) |
| *H04N 19/56* | (2014.01) |
| *G06T 7/269* | (2017.01) |
| *G06T 5/20* | (2006.01) |
| *G06T 5/00* | (2006.01) |
| *G06K 9/46* | (2006.01) |
| *G06K 9/62* | (2006.01) |
| *G06T 7/246* | (2017.01) |
| *G06K 9/32* | (2006.01) |

(52) U.S. Cl.
CPC ............ *G06K 9/6215* (2013.01); *G06T 5/002* (2013.01); *G06T 5/20* (2013.01); *G06T 7/246* (2017.01); *G06T 7/269* (2017.01); *H04N 19/20* (2014.11); *H04N 19/521* (2014.11); *H04N 19/523* (2014.11); *H04N 19/53* (2014.11); *H04N 19/56* (2014.11); *G06K 2009/3291* (2013.01); *G06K 2009/4666* (2013.01); *G06T 2207/30252* (2013.01)

(58) Field of Classification Search
CPC ........... G06K 2009/4666; H04N 19/20; H04N 19/521; H04N 19/523; H04N 19/53; H04N 19/56; G06T 7/246; G06T 7/269; G06T 5/002; G06T 5/20; G06T 2207/30252

See application file for complete search history.

(56) References Cited

U.S. PATENT DOCUMENTS

| | | | | |
|---|---|---|---|---|
| 5,909,251 | A * | 6/1999 | Guichard | G06K 9/342 348/416.1 |
| 5,995,080 | A * | 11/1999 | Biro | H04N 19/176 345/530 |
| 6,026,217 | A * | 2/2000 | Adiletta | H04N 19/159 375/E7.093 |
| 6,292,589 | B1 * | 9/2001 | Chow | H04N 19/197 348/416.1 |
| 6,452,637 | B1 * | 9/2002 | Rudin | G06K 9/342 348/416.1 |
| 6,731,799 | B1 * | 5/2004 | Sun | G06K 9/00369 348/142 |
| 7,085,401 | B2 * | 8/2006 | Averbuch | G06K 9/38 382/103 |
| 7,085,418 | B2 * | 8/2006 | Kaneko | G06T 7/20 382/209 |
| 7,194,126 | B2 * | 3/2007 | Konolige | G06T 7/20 382/154 |
| 7,212,572 | B2 * | 5/2007 | Akiyoshi | H04N 19/51 375/240.11 |
| 7,227,893 | B1 * | 6/2007 | Srinivasa | G06K 9/00771 348/155 |
| 7,404,645 | B2 * | 7/2008 | Margulis | G03B 21/20 348/630 |
| 7,668,406 | B2 * | 2/2010 | Schnee | G06K 9/2009 382/313 |
| 8,199,975 | B2 * | 6/2012 | Pomerleau | B60R 1/00 382/104 |
| 8,233,746 | B2 * | 7/2012 | Nakagami | H04N 5/14 382/299 |
| 8,260,008 | B2 * | 9/2012 | Hanna | G06K 9/00604 382/115 |
| 8,368,766 | B2 * | 2/2013 | Zhou | G06T 3/4038 348/208.14 |
| 8,369,579 | B2 * | 2/2013 | Frigerio | G06K 9/209 382/103 |
| 8,411,205 | B2 * | 4/2013 | Sasaki | G06T 5/002 348/620 |
| 8,538,075 | B2 * | 9/2013 | Kubota | H04N 5/23229 382/103 |
| 8,666,120 | B2 * | 3/2014 | Chen | H04N 7/0137 348/154 |
| 8,736,767 | B2 * | 5/2014 | van Beek | H04N 5/145 348/699 |
| 9,025,027 | B2 * | 5/2015 | Xue | G01J 3/0229 348/148 |
| 9,172,870 | B2 * | 10/2015 | Wu | H04N 5/23232 |
| 9,230,183 | B2 * | 1/2016 | Bechtel | B60R 1/04 |
| 9,440,535 | B2 * | 9/2016 | Schofield | B60Q 1/1423 |
| 9,571,819 | B1 * | 2/2017 | Barron | H04N 13/128 |
| 9,583,060 | B2 * | 2/2017 | Kimura | G06T 1/00 |
| 9,672,635 | B2 * | 6/2017 | Einecke | G06K 9/00791 |
| 9,681,150 | B2 * | 6/2017 | Garud | H04N 19/53 |
| 9,754,377 | B2 * | 9/2017 | Loghman | G06T 7/593 |
| 9,773,159 | B2 * | 9/2017 | Lee | G06K 9/00268 |
| 9,842,275 | B2 * | 12/2017 | Seki | G06K 9/56 |
| 9,892,496 | B2 * | 2/2018 | Barron | G06K 9/469 |
| 10,043,106 | B2 * | 8/2018 | Ishimaru | G06K 9/00805 |
| 10,268,901 | B2 * | 4/2019 | Garud | G06K 9/00791 |
| 2007/0206672 | A1 * | 9/2007 | Yamashita | H04N 19/60 375/240.01 |
| 2008/0278633 | A1 * | 11/2008 | Tsoupko-Sitnikov | H04N 5/144 348/699 |
| 2009/0168887 | A1 * | 7/2009 | Lin | H04N 19/14 375/240.16 |
| 2011/0235910 | A1 * | 9/2011 | Soceanu | G06K 9/00295 382/173 |
| 2013/0038698 | A1 * | 2/2013 | Yoshida | G06K 9/6203 348/47 |
| 2015/0023611 | A1 * | 1/2015 | Salvador | G06T 3/4053 382/263 |
| 2015/0071360 | A1 * | 3/2015 | Nguyen | H04N 19/597 375/240.18 |
| 2015/0104116 | A1 * | 4/2015 | Salvador | G06T 3/4053 382/300 |
| 2015/0154918 | A1 * | 6/2015 | Kimura | G09G 3/3426 345/102 |
| 2015/0365696 | A1 | 12/2015 | Garud et al. | |
| 2016/0150210 | A1 * | 5/2016 | Chang | G06T 7/593 382/154 |
| 2016/0275377 | A1 | 9/2016 | Mathew et al. | |
| 2017/0105005 | A1 * | 4/2017 | Chen | H04N 19/105 |
| 2017/0161565 | A1 | 6/2017 | Garud et al. | |
| 2017/0284799 | A1 * | 10/2017 | Wexler | G06T 7/62 |
| 2018/0005080 | A1 * | 1/2018 | Sugimura | G06K 9/2054 |
| 2018/0107281 | A1 * | 4/2018 | Kramer | G06F 3/0325 |
| 2018/0132009 | A1 * | 5/2018 | Ivanovic | H04N 21/00 |
| 2018/0144485 | A1 * | 5/2018 | Kobayashi | G06T 7/246 |
| 2018/0261172 | A1 * | 9/2018 | Kimura | G09G 3/3406 |

OTHER PUBLICATIONS

Jim Braux-Zin, et al, "A General Dense Image Matching Framework Combining Direct and Feature-based Costs", 2013 IEEE International Conference on Computer Vision (ICCV), Dec. 1-8, 2013, Sydney, NSW, Australia, pp. 185-192.

Ce Liu, et al, "SIFT Flow: Dense Correspondence across Scenes and its Applications", IEEE Transactions on Pattern Analysis and Machine Intelligence, vol. 33, Issue 5, May 2011, pp. 978-994, Date of Publication Aug. 19, 2010.

\* cited by examiner

| | 24 BITS DESCRIPTOR FOR SCALE INV. (1:1) | | | | | 8 BITS DESCRIPTOR APPENDED FOR SCALE INV. (1:2) | | | | | | | | 8 BITS DESCRIPTOR APPENDED FOR SCALE INV. (1:3) | | | | | | | | 8 BITS DESCRIPTOR APPENDED FOR SCALE INV. (1:1.5) | | | | | | | |
|---|---|---|---|---|---|---|---|---|---|---|---|---|---|---|---|---|---|---|---|---|---|---|---|---|---|---|---|---|---|
| QUERY IMAGE SCALED BINARY PIXEL DESCRIPTOR | b1 | b2 | b3 | ∘∘∘ | b24 | b7 | b8 | b9 | b12 | b13 | b16 | b17 | b18 | b7 | b8 | b9 | b12 | b13 | b16 | b17 | b18 | b1 | b3 | b5 | b11 | b14 | b20 | b22 | b24 |
| REFERENCE IMAGE SCALED BINARY PIXEL DESCRIPTOR | b1 | b2 | b3 | ∘∘∘ | b24 | b1 | b3 | b5 | b11 | b14 | b20 | b22 | b24 | b25 | b26 | b27 | b28 | b29 | b30 | b31 | b32 | b25 | b26 | b27 | b28 | b29 | b30 | b31 | b32 |

FIG. 12

HANDLING PERSPECTIVE MAGNIFICATION IN OPTICAL FLOW PROCESSING

CROSS-REFERENCE TO RELATED APPLICATIONS

This application claims benefit of India Provisional Patent Application Serial No. 201641043792, filed Dec. 22, 2016, which is incorporated herein by reference in its entirety.

BACKGROUND OF THE DISCLOSURE

Field of the Disclosure

Embodiments of the present disclosure generally relate to optical flow processing, and more specifically relate to handling perspective magnification in optical flow processing.

Description of the Related Art

Advanced driver assistance systems, or ADAS, are becoming increasingly commonplace in automobiles. These systems provide the driver with the information about the surroundings and potentially automatically intervene with the process of driving to prevent accidents and road fatalities. Three dimensional (3D) scene understanding using image sensors is an elementary step in building this scene understanding. Scene motion understanding using optical flow is a common technique that provides accurate motion estimation. For determining optical flow, one camera is employed to capture temporal sequences of images (video) of the same scene. Pairs of consecutive images are processed to determine the displacement of pixels between consecutive images. The displacement or flow vector information for the pixels can be used to analyze the motion of objects/volume corresponding to the pixels in the captured scene.

The optical flow techniques used in the ADAS are subject to continuously changing perspective due to camera motion through the scene, i.e., an object in temporally ordered images with relative motion toward or away from the camera appears to change size. When cameras with fisheye lenses are used, even lateral motion in the field of view (FOV) can cause an object to appear to change size in temporally ordered images.

Determination of the optical flow of a pixel is fundamentally a "best correspondence" finding problem. That is, given two consecutive images, a query image and a reference image, the problem is to find the best matching position of a pixel in the query image in the reference image. If perspective changes are not accounted for in searching for the best matching pixel, the match may be inaccurate and the inaccuracy may propagate to algorithms that use the optical flow information. One known approach to addressing perspective changes is the Scale Invariant Feature Transform (SIFT). However, SIFT is computationally complex and may be not suitable for real-time optical flow processing in ADAS.

SUMMARY

Embodiments of the present disclosure relate to methods and apparatus for handling perspective magnification in optical flow processing. In one aspect, a system for optical flow estimation is provided that includes a pixel match search engine configured to identify a candidate matching pixel in a reference image for a pixel in a query image and to determine a matching cost of the candidate matching pixel based on a first scaled binary pixel descriptor for the pixel and a second scaled binary pixel descriptor for the candidate matching pixel, and a census transform component configured to determine the first scaled binary pixel descriptor and the second scaled binary pixel descriptor. To determine the first scaled binary pixel descriptor, the census transform component is configured to determine a first binary pixel descriptor for the pixel as a binary census transform of first neighborhood pixels in the query image corresponding to a first scaling ratio, determine a second binary pixel descriptor for the pixel as the binary census transform of second neighborhood pixels in the query image corresponding to a second scaling ratio, wherein the first scaled binary pixel descriptor comprises the first binary pixel descriptor and the second binary pixel descriptor. To determine the second scaled binary pixel descriptor, the census transform component is configured to determine a third binary pixel descriptor for the candidate matching pixel as the binary census transform of third neighborhood pixels in the reference image, wherein relative positions of the third neighborhood pixels to the candidate matching pixel are relative positions of the first neighborhood pixels to the pixel scaled according to the first scaling ratio, determine a fourth binary pixel descriptor for the candidate matching pixel as the binary census transform of fourth neighborhood pixels in the reference image, wherein relative positions of the fourth neighborhood pixels to the candidate matching pixel are relative positions of the second neighborhood pixels to the pixel scaled according to the second scaling ratio, wherein the second scaled binary pixel descriptor comprises the third binary pixel descriptor and the fourth binary pixel descriptor.

In one aspect, a method of optical flow estimation is provided that includes identifying a candidate matching pixel in a reference image for a pixel in a query image, determining a first scaled binary pixel descriptor for the pixel by determining a first binary pixel descriptor for the pixel as a binary census transform of first neighborhood pixels in the query image corresponding to a first scaling ratio, determining a second binary pixel descriptor for the pixel as the binary census transform of second neighborhood pixels in the query image corresponding to a second scaling ratio, wherein the first scaled binary pixel descriptor comprises the first binary pixel descriptor and the second binary pixel descriptor, determining a second scaled binary pixel descriptor for the candidate matching pixel by determining a third binary pixel descriptor for the candidate matching pixel as the binary census transform of third neighborhood pixels in the reference image, wherein relative positions of the third neighborhood pixels to the candidate matching pixel are relative positions of the first neighborhood pixels to the pixel scaled according to the first scaling ratio, determining a fourth binary pixel descriptor for the candidate matching pixel as the binary census transform of fourth neighborhood pixels in the reference image, wherein relative positions of the fourth neighborhood pixels to the candidate matching pixel are relative positions of the second neighborhood pixels to the pixel scaled according to the second scaling ratio, wherein the second scaled binary pixel descriptor comprises the third binary pixel descriptor and the fourth binary pixel descriptor, and determining a matching cost of the candidate matching pixel based on the first scaled binary pixel descriptor and the second scaled binary pixel descriptor.

In one aspect, a method of optical flow estimation is provided that includes identifying a candidate matching pixel in a reference image for a pixel in a query image, and determining a matching cost of the candidate matching pixel based on a first neighborhood of pixels of the pixel and a second neighborhood of pixels of the candidate matching pixel and a set of scaling ratios, wherein relative positions of pixels in the first neighborhood of pixels and relative positions of pixels in the second neighborhood of pixels used in determining the matching cost are selected based on the set of scaling ratios.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency.

A moving object in the real world has a three dimensional (3D) motion. A camera capturing a moving object captures a two dimensional (2D) projection of the actual 3D motion. The 2D motion of a moving object can be determined by observing consecutive captured images of the object. The 2D motion of an image pixel from image to image is referred to as the optical flow of the pixel and is defined as the displacement vector of the pixel between two consecutive images. For dense optical flow, the optical flow of each pixel is determined.

As previously mentioned, determination of the optical flow of a pixel is fundamentally a "best correspondence" finding problem. That is, given two consecutive images, a query image and a reference image, the problem is to find the best matching position of a pixel in the query image in the reference image. In general, the search for the best matching pixel is performed within a predetermined region, referred to as the search range, in the reference image. A predictor based search strategy may be used to avoid searching for correspondence at every pixel in the search range.

A common approach to assessing pixel matches is to measure the Hamming distance between binary pixel descriptors of the pixels where the binary pixel descriptors are generated using a binary census transform. Using a binary census transform is favored in many approaches as census descriptors are by construction invariant under global monotonically increasing grey level rescalings. In general, a census transform is a form of non-parametric local transform, i.e., the transform relies on the relative ordering of local intensity values, and not on the actual intensity values, used to map the intensity values of pixels in a neighborhood around a pixel to a bit string, thus capturing the image structure around the pixel. In the output bit string for a pixel, a bit corresponding to a neighborhood pixel is set to one if the neighborhood pixel has a grayscale value greater than or equal to grayscale value of the pixel and is otherwise set to zero.

Figure 1:
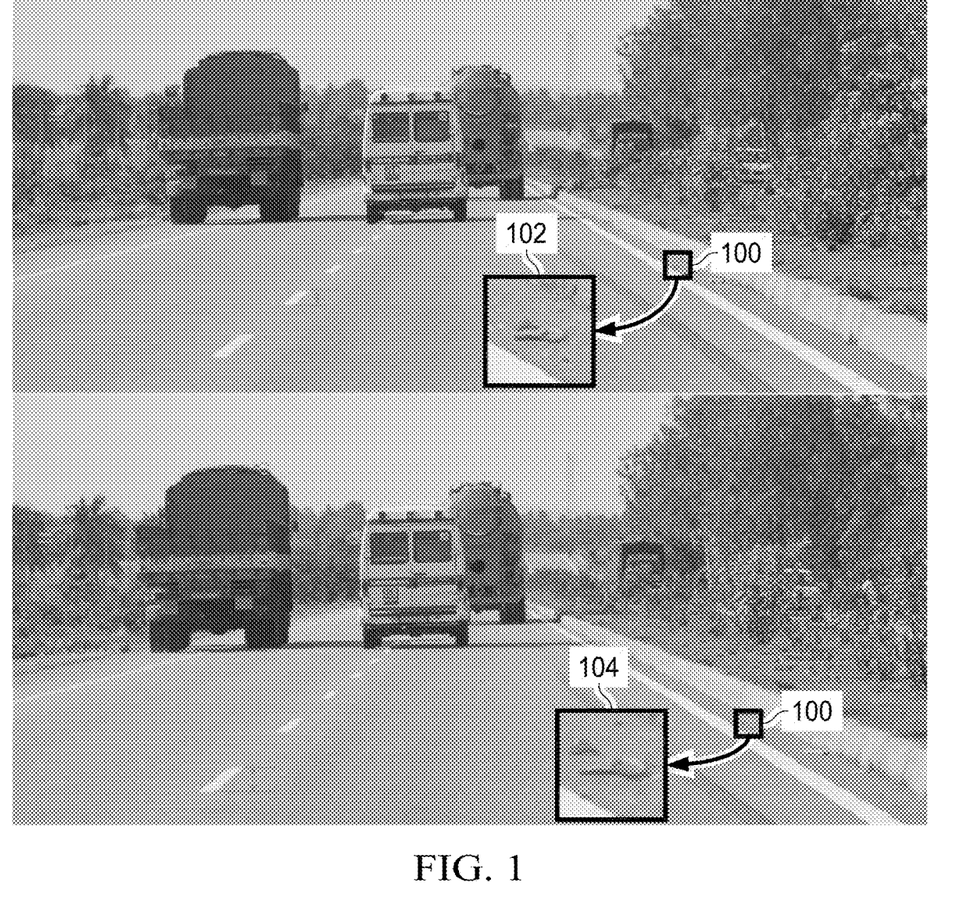
FIG. 1 illustrates perspective magnification of scene features in temporally consecutive images.

As previous mentioned, optical flow techniques used in driver assistance systems need to be able to deal with continuously changing perspective due to camera motion through the scene. FIG. 1 illustrates the perspective magnification of scene features 100 in two temporally consecutive images due to forward motion of a camera mounted on a vehicle. The images 102, 104 are magnified views of the scene features 100 in each image showing the increase in size of the scene features 100 due to perspective magnification. Further, there can be multiple perspective magnifications present in the scene. For example, the ground plane, which is generally the closest scene element from the camera, has the highest relative motion and extends from proximal points to the horizon giving rise to large variations in perspective magnification based on the distance from camera and the relative motion. Given the likely presence of perspective magnification, a combination of binary pixel descriptors and a cost function that can find an accurate match in the presence of perspective magnification are desirable.

Embodiments of the disclosure provide a census transform approach in which different census descriptors, i.e., binary pixel descriptors, of the same size are defined using a different set of neighborhood pixels in each of the temporally ordered images. More specifically, neighborhood pixels used to compute a binary pixel descriptor for a central pixel in the reference image are at distances from the central pixel proportionately scaled from distances used to compute a binary pixel descriptor of a corresponding central pixel in the query image. Multiple discrete scale ratios may be used to determine multiple binary pixel descriptors that may be concatenated to form final scaled binary pixel descriptors for the central pixels in each image. The discrete scale ratios help account for the scaling of the features, i.e., the perspective magnification, across temporally consecutive images. Further, in some embodiments, the Hamming distance computation is modified to help account for the scaling of features across temporally consecutive images. More specifically, the Hamming distance computation is modified to use multiple discrete scale ratios and pixel neighborhoods. Some embodiments may be implemented in an optical flow accelerator in an embedded computer vision system.

In general, to generate scaled binary pixel descriptors, neighborhood pixels used to compute the binary descriptor of a central pixel in the reference image are at a scaled distance, proportionate to the perspective magnification, in the same direction from the central pixel as corresponding neighborhood pixels used in computation of the binary descriptor of a corresponding central pixel in a query image. Unless otherwise specified, in the description herein, the query image is assumed to be an image received at time t−1 and the reference image is assumed to be an image received at time t. One of ordinary skill in the art will understand embodiments in which the query image is the image received at time t and the reference image is the image received at time t−1.

Let $S=[s_1, s_2, \ldots, s_m]$ be the m discrete scaling ratios for computing binary census transforms for a query image $I^q$ and a reference image $I^r$. Let $N_k^q=[p_{1,k}, p_{2,k}, \ldots, p_{n,k}]$ be the n ordered neighborhood pixels for computing the census transform for the query image $I^q$ for $k^{th}$ scaling ratio of $s_k$. Then, $N_k^r=s_k \times N_k^q$, are the n corresponding ordered neighborhood pixels for computing the census transform for the reference image $I^r$. Here $p_{a,k}=(dx_{a,k}, dy_{a,k})$ is the relative position, i.e., the two dimensional (2D) offset, of the $a^{th}$ neighborhood pixel with respect to the pixel for which the binary census transform is to be computed.

The binary descriptor for a pixel at location (x, y) in the query image $I^q$ based on the binary census transform at the $k^{th}$ scaling ratio is defined as $$B_k^q(x,y)=b_{1,k}^q(x,y)\|b_{2,k}^q(x,y)\|\|b_{n,k}^q(x,y) \quad (1)$$

and the binary descriptor for a pixel at location (x, y) in the reference image $I^r$ is defined as $$B_k^r(x,y)=b_{1,k}^r(x,y)\|b_{2,k}^r(x,y)\|\|b_{n,k}^r(x,y) \quad (2)$$

where $\|$ is the concatenation operation on binary numbers and $b_{a,k}$ is defined as $$b_{a,k}(x, y) = \begin{cases} 1 & \text{if } I((x, y)+(dx_{a,k}, dy_{a,k})) \geq I(x, y) \\ 0 & \text{otherwise} \end{cases} \quad (3)$$

In Eq. 3, the value of $(x, y)+(dx_{a,k}, dy_{a,k})$ or (x, y) may point to the non-integer locations in the image for which the pixel value is not defined. In such cases, the missing value may be obtained using any suitable technique, such as, for example, bilinear or cubic interpolation.

A single scaled binary pixel descriptor can be obtained by concatenating the individual binary descriptors for the m discrete scaling ratios as per $$B^q(x,y)=B_1^q(x,y)\|B_2^q(x,y)\|\|B_m^q(x,y) \quad (4)$$

and $$B^r(x,y)=B_1^r(x,y)\|B_2^r(x,y)\|\|B_m^r(x,y) \quad (5)$$

The Hamming distance between the two scaled binary pixel descriptors $B^q$ and $B^r$ may be computed as per $$HD=\text{bitcount}(B^q \oplus B^r) \quad (6)$$

where $\oplus$ is the bitwise exclusive-or operations between binary vectors, bitcount calculates the number of bits set to one after the bitwise exclusive-or operation, and HD is the Hamming distance, i.e., the matching cost. However, comparing matching costs of single pixel pairs may not fully comprehend the characteristics of the local regions around the pixels and thus may not provide a robust match. To increase robustness, the pixel pair wise Hamming distance may be accumulated over a cost calculation window centered around the pixel in the query image and around the candidate matching pixel in the reference image to capture more of the local image characteristics within the matching cost function. A cost calculation window may also be referred to as a cost calculation neighborhood. Any suitable size of the cost calculation window may be used. The cost calculation window that results in the least accumulated Hamming distance is chosen as the best match. The accumulated Hamming distance may be computed as per $$HD=\text{bitcount}(Qv \oplus Rv) \quad (7)$$

where Qv is a binary vector formed by concatenating $B^q$ for each pixel in the cost calculation window and Rv is a binary vector formed by concatenating $B^r$ for each pixel in the cost calculation window. For example, if the cost calculation window is 9×9, Qv and Qr will each include 81 binary descriptors. The binary vector Qv and the binary vector Rv may be referred to as accumulated binary descriptors herein.

The above model can handle multiple magnifications of arbitrary amount or degree. As previously mentioned, the ground plane extends from proximal points to the horizon giving rise to large variations in perspective magnification based on object distance from the camera and relative motion. Thus, the number of discrete scaling ratios needed in the above model to address these variations is large and the complexity involved in using a large number of scaling ratios may be computationally prohibitive, especially in an embedded application, as each additional scaling ratio increases the binary descriptor length, the number of comparison operations, and may increase the number of interpolations to predict missing pixel values. Accordingly, in adopting the model for practical use, a balance between quality and computational complexity may be considered.

Figure 2A:
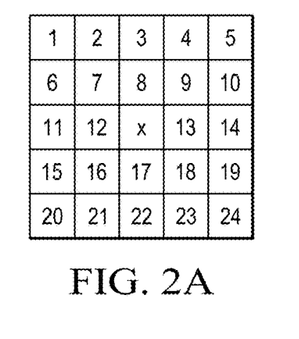
FIGS. 2A-2C are an example illustrating scaled binary pixel descriptors.
Figure 2B:
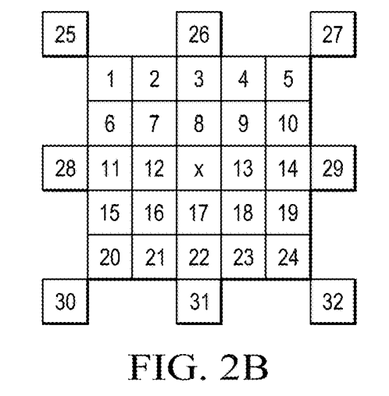
Figure 2C:
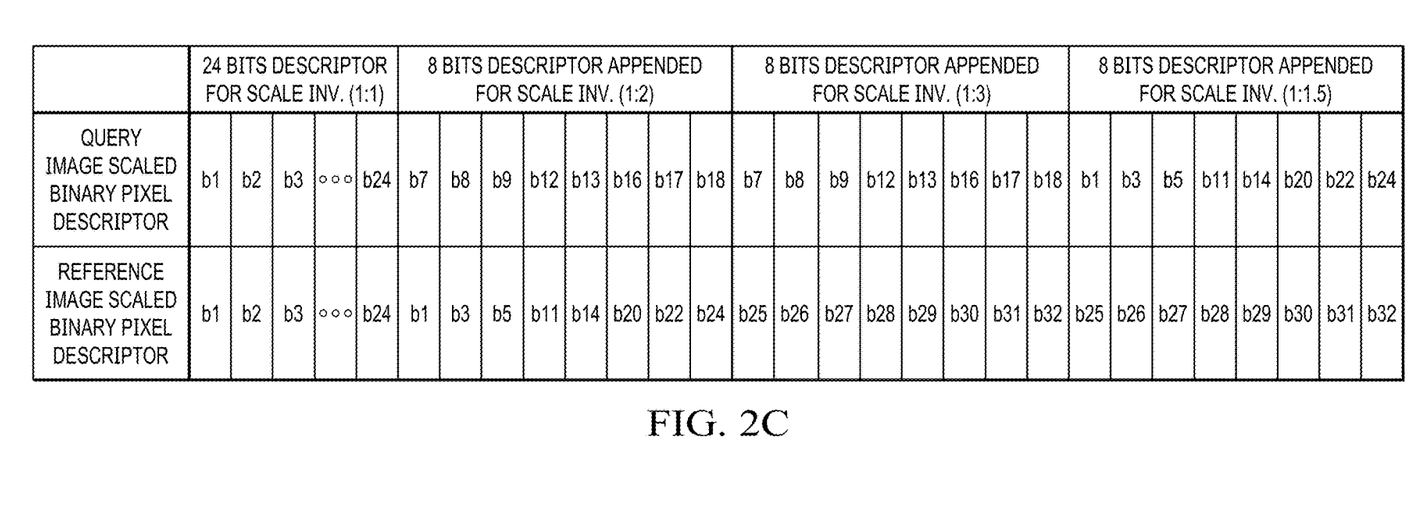

FIGS. 2A-2C are an example illustrating scaled binary pixel descriptors. In this example, m=4 scaling ratios and a forty-eight pixel configuration for $N_k^q$ ($n_k$=24, 8, 8, and 8) are used. The scaling ratios and the pixel configuration of the binary descriptors are chosen such that interpolation operations are not required for computation of $B^q$ or $B^r$ and cost function evaluation is optimized for the perspective magnification where the features are expanding, e.g., the images are from a front facing camera on a vehicle moving forward. More specifically, for this example,

S=[1, 2, 3, 1.5]

$N_1^q=[p_{1,1}, p_{2,1}, \ldots, p_{24,1}]$, $N_2^q=[p_{1,2}, p_{2,2}, \ldots, p_{8,2}]$, $N_3^q=[p_{1,3}, p_{2,3}, \ldots, p_{8,3}]$ $N_3^q=[p_{1,4}, p_{2,4}, \ldots, p_{8,4}]$ where Table 1 defines the relative positions (dx, dy) for neighborhood pixels with respect to the central pixel in the query image for the four scaling ratios and Table 2 defines the scaled relative position (dx, dy) for neighborhood pixels with respect to the central pixel in the reference image. The scaled relative positions in the reference image are determined by multiplying the relative positions in the query image by the scaling factors.

The choice of scaling ratios and descriptor size leads to use of a 5×5 pixel neighborhood for census descriptor computation in the query image and a 7×7 pixel neighborhood for census descriptor computation in the reference image. FIG. 2A illustrates the query image neighborhood and FIG. 2B illustrates the reference image neighborhood. FIG. 2C illustrates the forty-eight bit scaled binary pixel descriptors with reference to the numbered bit positions in the respective neighborhoods in FIGS. 2A and 2B.

Note that for applications in which the perspective magnification is such that features are predominantly shrinking, e.g., the images are from a rear facing camera on a vehicle moving forward or the query frame is captured at time t and the reference frame is captured at time t−1 from a front mounted camera, the scale ratios S can be inverted and N swapped with $N_k^r$.

TABLE 1

| Neighborhood pixel a | Neighborhood pixel offset $p_{a,k}$ | | | |
|---|---|---|---|---|
| | k = 1 ($s_1$ = 1) | k = 2 ($s_2$ = 2) | k = 3 ($s_3$ = 3) | k = 4 ($s_4$ = 1.5) |
| 1 | -2, -2 | -1, -1 | -1, -1 | -2, -2 |
| 2 | -2, -1 | -1, 0 | -1, 0 | -2, 0 |
| 3 | -2, 0 | -1, 1 | -1, 1 | -2, 2 |
| 4 | -2, 1 | 0, -1 | 0, -1 | 0, -2 |
| 5 | -2, 2 | 0, 1 | 0, 1 | 0, 2 |
| 6 | -1, -2 | 1, -1 | 1, -1 | 2, -2 |
| 7 | -1, -1 | 1, 0 | 1, 0 | 2, 0 |
| 8 | -1, 0 | 1, 1 | 1, 1 | 2, 2 |
| 9 | -1, 1 | | | |
| 10 | -1, 2 | | | |
| 11 | 0, -2 | | | |
| 12 | 0, -1 | | | |
| 13 | 0, 1 | | | |
| 14 | 0, 2 | | | |
| 15 | 1, -2 | | | |
| 16 | 1, -1 | | | |
| 17 | 1, 0 | | | |
| 18 | 1, 1 | | | |
| 19 | 1, 2 | | | |
| 20 | 2, -2 | | | |
| 21 | 2, -1 | | | |
| 22 | 2, 0 | | | |
| 23 | 2, 1 | | | |
| 24 | 2, 2 | | | |

TABLE 2

| Neighborhood pixel a | Neighborhood pixel offset $P_{a,k}$ | | | |
|---|---|---|---|---|
| | k = 1 ($s_1$ = 1) | k = 2 ($s_2$ = 2) | k = 3 ($s_3$ = 3) | k = 4 ($s_4$ = 1.5) |
| 1 | -2, -2 | -2, -2 | -3, -3 | -3, -3 |
| 2 | -2, -1 | -2, 0 | -3, 0 | -3, 0 |
| 3 | -2, 0 | -2, 2 | -3, 3 | -3, 3 |
| 4 | -2, 1 | 0, -2 | 0, -3 | 0, -3 |
| 5 | -2, 2 | 0, 2 | 0, 3 | 0, 3 |
| 6 | -1, -2 | 2, -2 | 1, -3 | 3, -3 |
| 7 | -1, -1 | 2, 0 | 3, 0 | 3, 0 |
| 8 | -1, 0 | 2, 2 | 3, 3 | 3, 3 |
| 9 | -1, 1 | | | |
| 10 | -1, 2 | | | |
| 11 | 0, -2 | | | |
| 12 | 0, -1 | | | |
| 13 | 0, 1 | | | |
| 14 | 0, 2 | | | |
| 15 | 1, -2 | | | |
| 16 | 1, -1 | | | |
| 17 | 1, 0 | | | |
| 18 | 1, 1 | | | |
| 19 | 1, 2 | | | |
| 20 | 2, -2 | | | |
| 21 | 2, -1 | | | |
| 22 | 2, 0 | | | |
| 23 | 2, 1 | | | |
| 24 | 2, 2 | | | |

The prior art approach to Hamming distance computation may also be modified to help account for the scaling of features across temporally consecutive images. More specifically, a scaled Hamming distance computation approach may be used in which the binary Hamming distance of the binary descriptor corresponding to a pixel at a location in the query image is compared with the binary descriptor of a pixel in the reference image at a scaled distance proportionate to the perspective magnification in the same direction from the central pixel of the cost calculation window.

The prior art accumulated Hamming distance computation approach as given in Eq. 7 can also be expressed as $$HD = \Sigma_{i=-h}^{h} \Sigma_{j=-w}^{w} \text{bitcount}(B^q((x_q,y_q)+(i,j)) \oplus B^r((x_r,y_r)+(i,j))) \quad (8)$$

where the size of the cost calculation window is h×w, ($x_q$, $y_q$) is the center pixel location in the cost calculation window in the query image, and ($x_r$, $y_r$) is the center pixel in cost calculation window in the reference image.

The modification to the accumulated Hamming distance computation is similar to the modification to the census transform computation in that multiple discrete scale ratios may be applied to define the pixels in the cost calculation windows to be used to compute the Hamming distance. The scaled accumulated Hamming distance computation is given by $$HD = \Sigma_{i=1}^{f} \Sigma_{j=1}^{g_i} \text{bitcount}(B^q((x_q,y_q)+p_{j,i}) \oplus B^r((x_r,y_r)+s_{Hi} \times p_{j,i})) \quad (9)$$

where $S_H = [s_{H1}, s_{H2}, \ldots, s_{Hf}]$ is the set of f discrete scaling ratios for the Hamming distance computation, $N_k^{Hq} = [p_{1,k}, p_{2,k}, \ldots, p_{g,k}]$ is the g pixels in the cost calculation window of the query image for the $f^{th}$ scaling ratio, and $p_{a,k}$ is the relative position, i.e., the two dimensional (2D) offset, of the $a^{th}$ pixel in the cost calculation window in the query image with respect to the center pixel. The scaled accumulated HD computation may use the same scaling ratios as those used to compute the scaled binary descriptors, may use a set of scaling ratios that includes some but not all of the scaling ratios used to compute the scaled binary descriptors, and/or may use more or fewer scaling ratios than the number used to compute the scaled binary descriptors.

Figure 3:
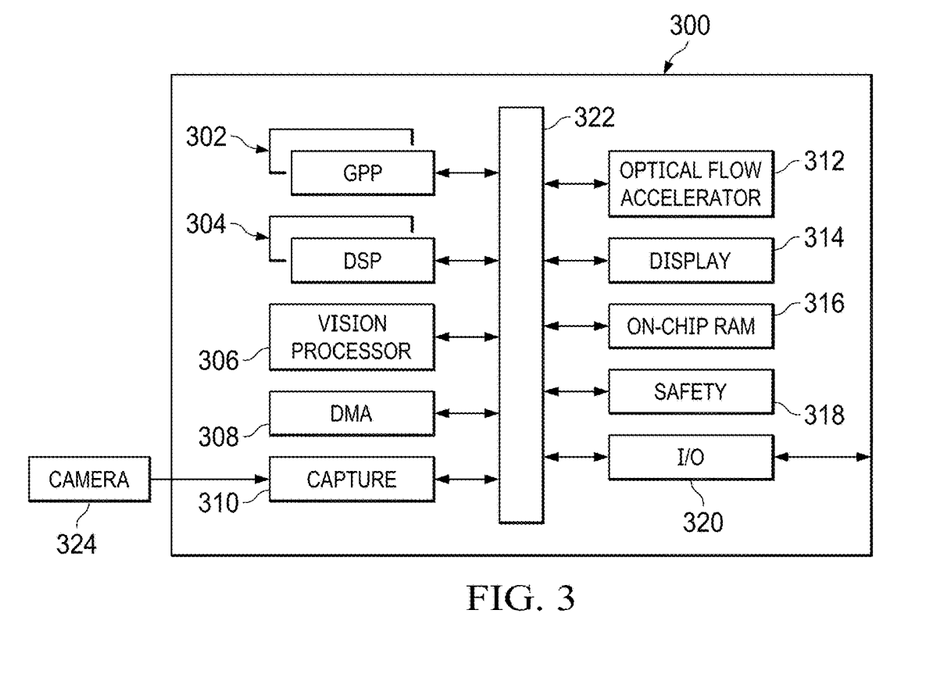
FIG. 3 is a high level block diagram of an example multiprocessor system-on-a-chip (SOC)

FIG. 3 is a high level block diagram of an example multiprocessor system-on-a-chip (SOC) 300 configured to support computer vision processing in a camera-based ADAS. The SOC 300 includes dual general purpose processors (GPP) 302, dual digital signal processors (DSP) 304, a vision processor 306, and an optical flow accelerator 312 coupled via a high speed interconnect 322. As is explained in more detail herein, the optical flow accelerator 312 is configured to perform dense optical flow processing on incoming pairs of camera images. As part of the dense optical flow processing, the optical flow accelerator 312 is configured to use census transforms as described herein. The vision processor 306 is a vector processor tuned for computer vision processing such as gradient computation, orientation binning, histogram normalization, etc. The GPP 302 hosts the operating system and provides overall control of the operation of the SOC 300 including scheduling of the processing performed by the optical flow accelerator 312. The DSP 304 provides support for computer vision processing such as object detection and classification, which may use the output of the optical flow accelerator 312.

The SOC 300 further includes a direct memory access (DMA) component 308, a camera capture component 310 that may be coupled to an external camera 324, a display management component 314, on-chip random access (RAM) memory 316, e.g., a computer readable medium, and various input/output (I/O) peripherals 320 all coupled to the processors and the optical flow accelerator 312 via the interconnect 322. The camera 324 may be coupled to the SOC 300 via an analog connection, an Ethernet cable, a low-voltage differential signaling (LVDS) cable, or other suitable wired or wireless connection. In addition, the SOC 300 includes a safety component 318 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures.

Figure 4:
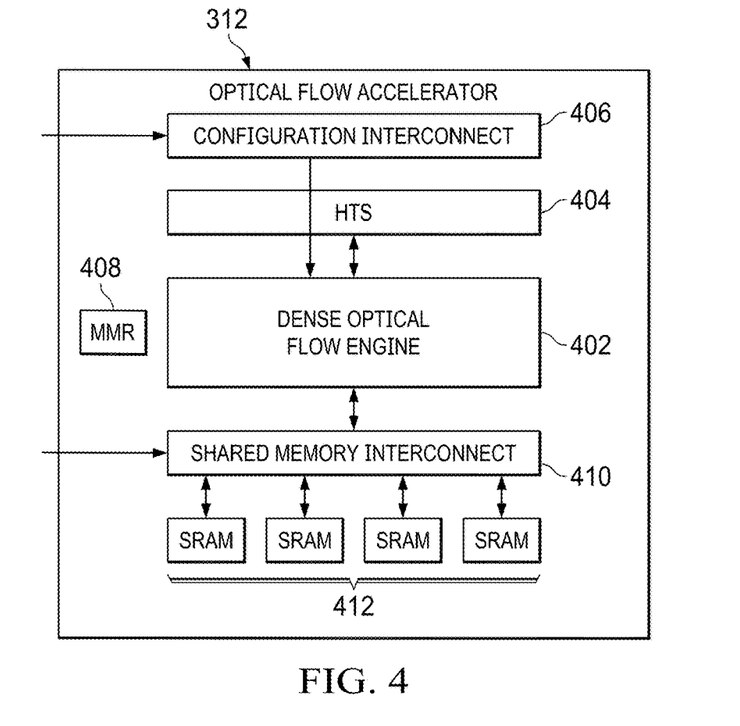
FIG. 4 is high level block diagram of an example optical flow accelerator of the SOC of FIG. 3.

FIG. 4 is a high level block diagram of an example optical flow accelerator 312. The optical flow accelerator 312 includes a configuration interconnect 406, a hardware thread scheduler (HTS) 404, a dense optical flow engine (DOFE) 402, memory mapped registers (MMR) 408, a shared memory interconnect 410, and shared memory 412.

The configuration interconnect 406 provides an interface for configuring the parameters of the optical flow accelerator 312. The configuration interconnect 406 also provides an interface for observing the status to the processing performed by the optical flow accelerator 312.

The HTS 404 implements thread management and control triggering of processing threads in the DOFE 402. The HTS 404 also manages message transfer and control between the optical flow accelerator 312 and other components in the SOC 300, e.g., the DSP 304.

The shared memory 412 stores input and output data for the dense optical flow engine 402. The shared memory 412 includes four banks of static random access memory. The shared memory interconnect 410 is a crossbar with pipelined command and response handling. The DMA 308 is connected to the shared memory interconnect 410 and is used to move data for processing by the DOFE 402 into the shared memory and to move the optical flow data produced by the DOFE 402 out of the optical flow accelerator 312 for consumption by other components on the SOC 300.

The MMR 408 is configured to store various control and configuration parameters for the DOFE 402. Parameters may include buffer sizes and addresses in the shared memory 412, horizontal and vertical search ranges, confidence score configuration values, etc.

The DOFE 402 is configured to find the optical flow vector map between all pixels of a pair of input images, referred to as the reference image and the query image herein. The query image is the image received at time t−1 and the reference image is the image received at time t. The dense optical flow approach implemented by the DOFE 402 is based on motion/flow vector predictors and uses a coarse-to-fine correspondence search strategy leveraging image pyramids of the reference image and the query image.

The coarse-to-fine correspondence search is based on the fact that a large displacement of a pixel between two consecutive images can be reduced to a smaller displacement at lower spatial resolution, thereby reducing the complexity of the correspondence search problem. For this search approach, a successively scaled down image structure is created from each input image. For example, a Gaussian image pyramid for an image may be created by filtering an input image using a 5×5 Gaussian low pass filter and then down sampling the filtered image by a factor of two in the horizontal and vertical directions. The resulting image is then subjected to the same process, and the cycle is repeated until the desired number of pyramid levels, e.g., six levels, is generated. Each cycle of this process results in a smaller image with increased smoothing and decreased spatial sampling density, i.e., decreased image resolution.

In the resulting pyramid, the original image may be referred to as the base pyramid level or level 0 and the smaller resolution images may be referred to as higher pyramid levels, e.g., levels 1 to 5, assuming there are five higher levels. Note that in the example Gaussian image pyramid, each pyramid level is ¼ the size of the next lower level. Thus a pixel at a particular pyramid level corresponds to a 2×2 block of four pixels at the next lower pyramid level. Also a distance measured at a higher pyramid level is ½ of the distance at the next lower pyramid level.

Figure 5:
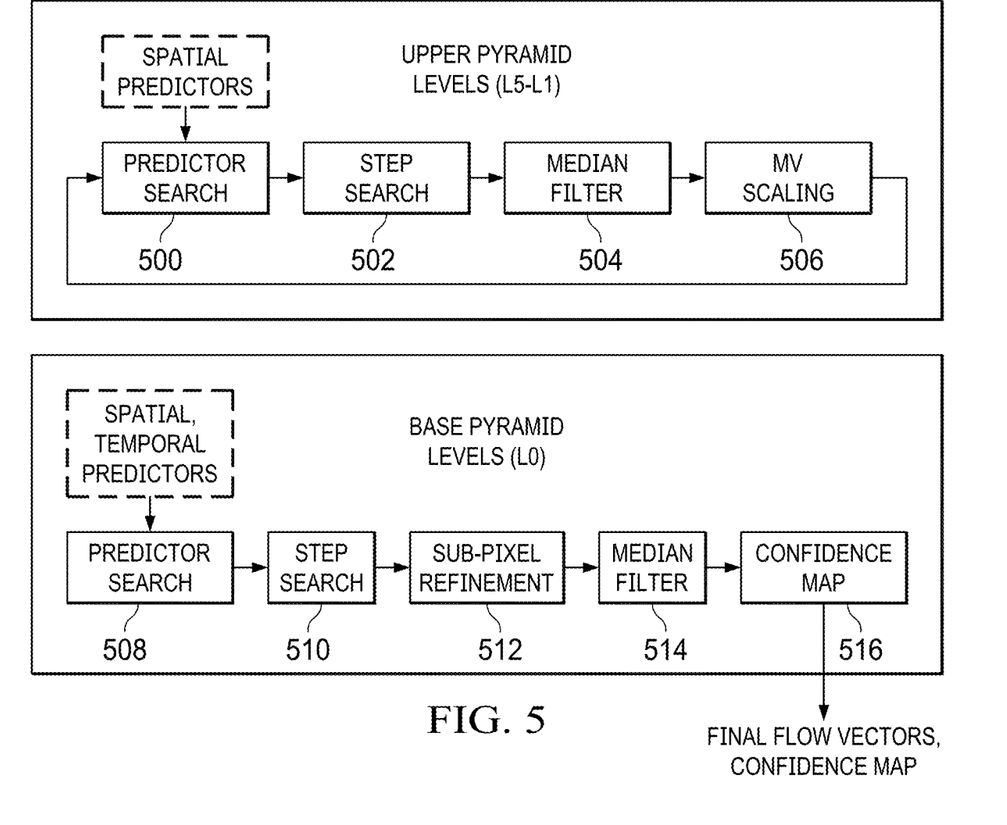
FIG. 5 illustrates the processing steps to generate a dense optical flow vector map that may be performed by the optical flow accelerator of FIG. 4.

FIG. 5 illustrates processing steps to generate a dense optical flow vector map that may be performed, for example, in the DOFE 402. This figure assumes that the image pyramids have five upper levels generated as described above. One of ordinary skill in the art will understand that more or few levels may be used. Each of the pyramid levels is processed in turn to generate an optical flow vector for each pixel in the level image beginning with the highest pyramid level. At each upper pyramid level, a predictor based search strategy 500 is applied to find an initial match which is then further refined with a hierarchical step search strategy 502 resulting in an integer pixel accurate flow vector for each pixel. A median filter 504 is applied to the flow vectors to remove impulsive estimation noise. The filtered flow vectors are scaled up 506 by two and used as initial predictors at the next lower pyramid level.

At the base pyramid level, the predictor based search strategy 508 is applied to original images to find initial matches which are then further refined with the hierarchical step search strategy 510 resulting in an estimated integer pixel accurate flow vector for each pixel. After determining the integer pixel flow vectors, the pixel correspondence is further refined 512 to a sub-pixel level accuracy. A median filter 514 is applied to the refined flow vectors to remove impulsive estimation noise. Any suitable median filter may be used. A confidence map 516 is generated by computing a quantitative estimate of correctness, referred to as the confidence score, for each final estimated flow vector. The final estimated flow vectors and the confidence map are then packed together to form a dense optical flow map which is stored in external memory. Any suitable technique for computing confidence scores may be used.

The predictor search 500, 508 and the step search 502, 510 at each pyramid level search at each pyramid level find the best matching pixel in the reference image for each pixel in the query image. For a pixel in the query image, the search for the best matching pixel in the reference image is restricted to a search window in the image. The best match is determined based a matching cost computed for the current pixel in the query image and each candidate matching pixel in the reference image. Prior to computing the matching cost, scaled binary descriptors for each pixel are computed according to an embodiment of the above described approach for determining scaled binary descriptors. The number of scaling ratios, the number of bits in the descriptors, the neighborhood configurations, etc. are implementation dependent and may be determined empirically. In some embodiments, the scaled binary pixel descriptors are determined as per the example of FIGS. 2A-2C. Further, the scaled binary pixel descriptors are computed for each pixel in a cost calculation window centered on the current pixel in the query image and on the candidate matching pixel in the reference image. The matching cost is then measured based on the accumulated Hamming distances over a cost calculation window as per Eq. 7 above.

The predictor search 500, 508 uses predictors to prune the full search window to avoid searching for correspondence at each pixel in the search window. Such a search basically assumes spatial and temporal locality and smoothness of motion, i.e., that pixels in a small neighborhood are highly likely to have similar motion and that motion changes smoothly both spatially and temporally. Further, rather than searching for each pixel in the current frame, the search is performed for non-overlapping blocks of pixels, which is may be referred to as paxels herein. For example purposes, a paxel is assumed to be a 2×2 block of pixels. Other suitable block sizes may be used.

Figure 6:
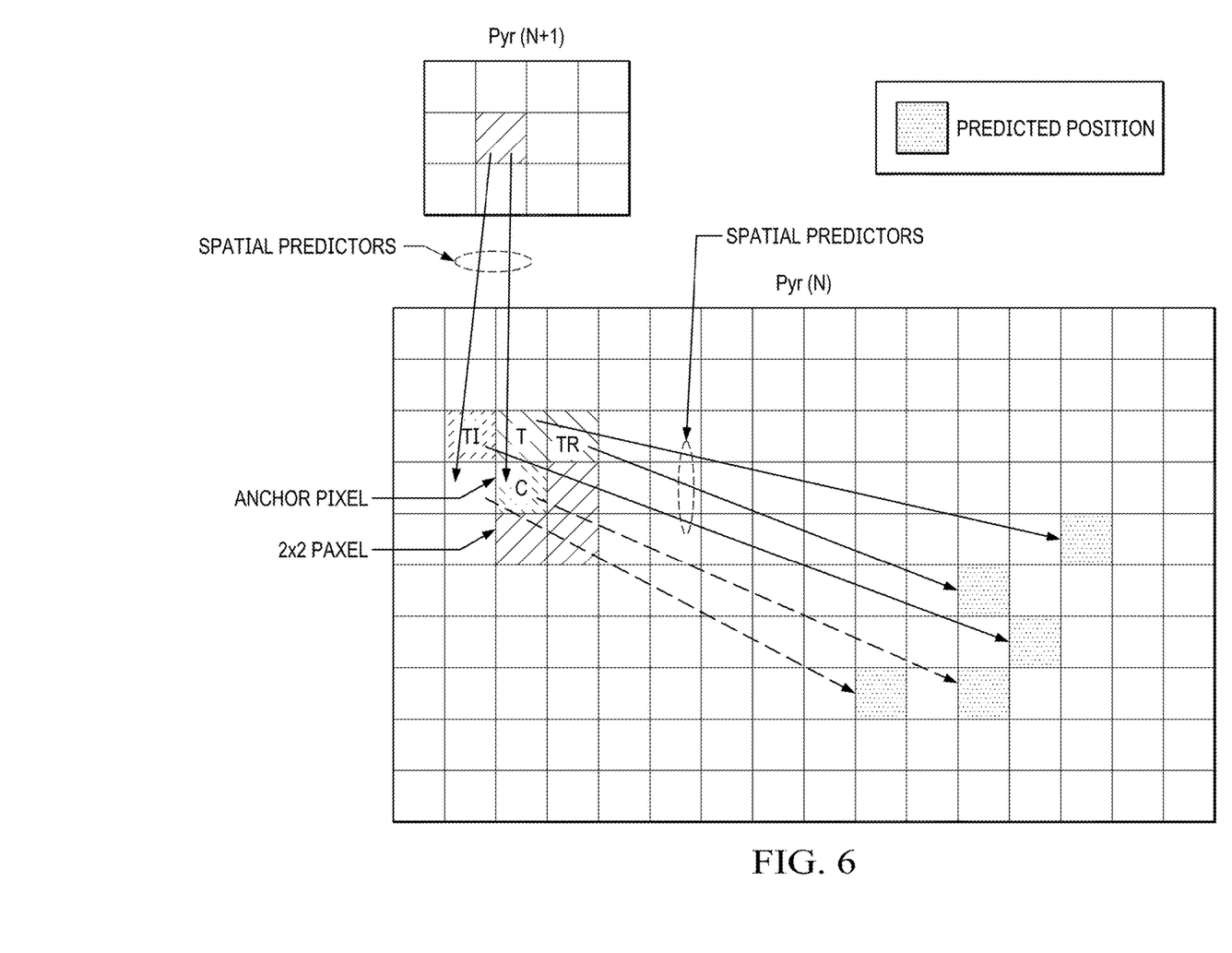
FIG. 6 shows example spatial predictors.

In the predictor search 500, 508, every 2×2 block of pixels at any pyramid level is assumed to be predictable by a set of flow vector values, which may be referred to as flow vector predictors or predictors, which are selected from the actual/estimated flow vectors of spatial or temporal neighbors of the block. The predictors are defined with respect to the top left pixel of the 2×2 pixel block, which may be referred to as the anchor pixel herein. Any suitable type and/or number of predictors may be used. In some embodiments, five spatial predictors and a single temporal predictor are used. The five spatial predictors are illustrated in FIG. 6. The spatial predictors are the flow vector of the pixel at the top left (TL) of the anchor pixel, the flow vector of the pixel at the top (T) of the anchor pixel, the flow vector of the pixel at the top right (TR) of the anchor pixel, the flow vector of the pixel to the immediate left of the anchor pixel as estimated in the previous pyramid level, and the flow vector of the pixel in the same position as the anchor pixel as estimated in the previous pyramid level. The temporal predictor is the flow vector of the pixel in the same position as the anchor pixel as estimated in the previous image.

In some embodiments, an additional spatial predictor is used, the flow vector of a pixel that is n pixels to the left of the anchor pixel in the same row. The value of n depends on the pipeline depth of the DOFE 402. This predictor may be referred to as the delayed left predictor.

The spatial predictors are used at all pyramid levels and the temporal predictor is used in the base pyramid level. The predictor that results in a matching candidate with the minimum matching cost is selected as the winning predictor for the paxel. The step search 502, 510 is then applied around the winning predictor from the predictor search 500, 508 to further refine the matching position. The step search 502, 510 is intended to refine the best matching position from the winning predictor in a limited two dimensional (2D) area around the winning predictor position. The step search 502, 510 is performed for each pixel in the paxel to determine a flow vector for each pixel.

In some embodiments, a hierarchical step search technique referred to as the 3-1 step search is used. Initially, eight pixel positions around the winning predictor position are searched. The eight pixel positions are selected such that the positions are three pixels away from the winning predictor position in each of eight directions, i.e., north, northeast, east, southeast, south, southwest, west, and northwest. The best match position from this search is further refined by choosing eight similarly positioned pixels at a one pixel distance from the best match position. The best match position from this one pixel search is selected as the final integer pixel accurate flow vector.

Figure 7:
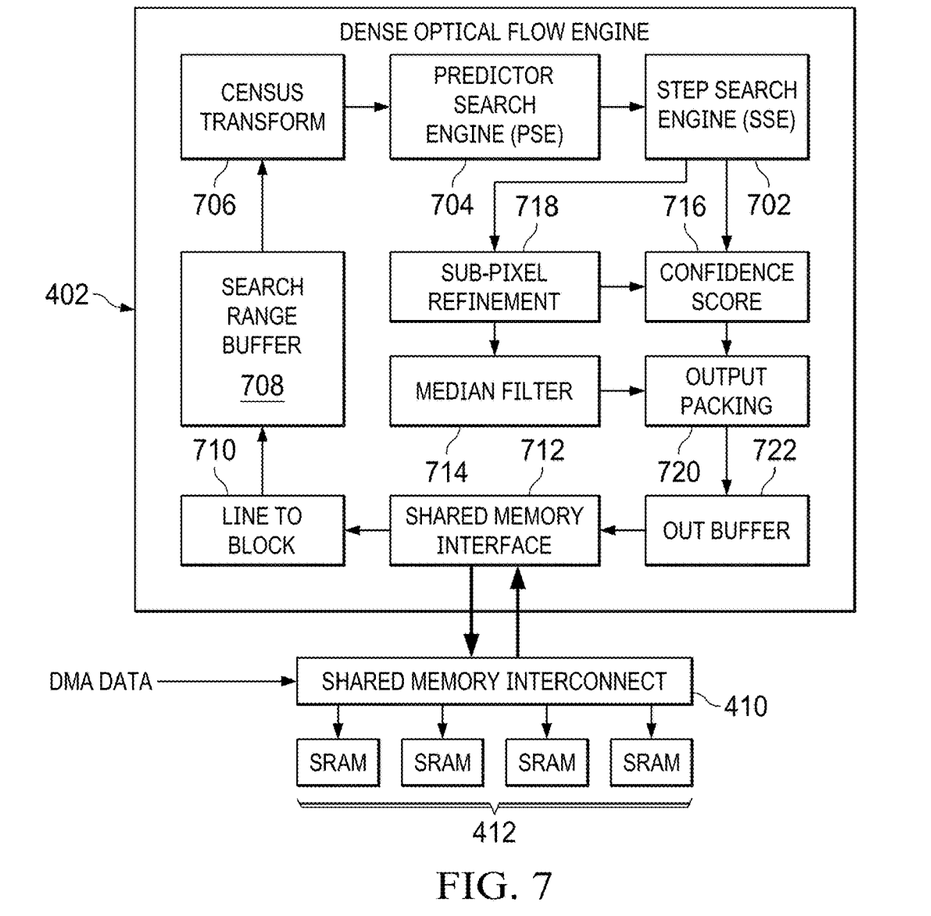
FIG. 7 is a high level block diagram of an example architecture for a dense optical flow engine (DOFE) in the optical flow accelerator of FIG. 4.

FIG. 7 is a high level block diagram of an example architecture for the DOFE 402 of FIG. 4. A census transform component 706, a predictor search engine (PSE) 704 and a step search engine (SSE) 702 are coupled in series and are configured to perform the previously described census transforms, predictor search, and step search on query and reference pixel data stored in the search range buffer 708. A sub-pixel refinement component 718 is configured to perform the previously described sub-pixel refinement on the best match positions resulting from the step search performed at the base pyramid level. A median filter component 714 is configured to perform the previously described median filtering and a confidence score component 716 is configured to generate confidence scores for the selected best match positions.

The output packing component 720 is configured to pack a stream of flow vectors from the median filter component 714 and a stream of corresponding confidence scores from the confidence score component 716 to produce a flow vector map that is stored in the output buffer 722. The shared memory interface 712 is configured to read the flow vector map from the output buffer 722 and store the map in the shared memory 412 via the shared memory interconnect 410. The flow vector map may then be transferred to external memory from the shared memory 712, e.g., the on-chip RAM 316 of FIG. 3, by the DMA 308.

Figure 8:
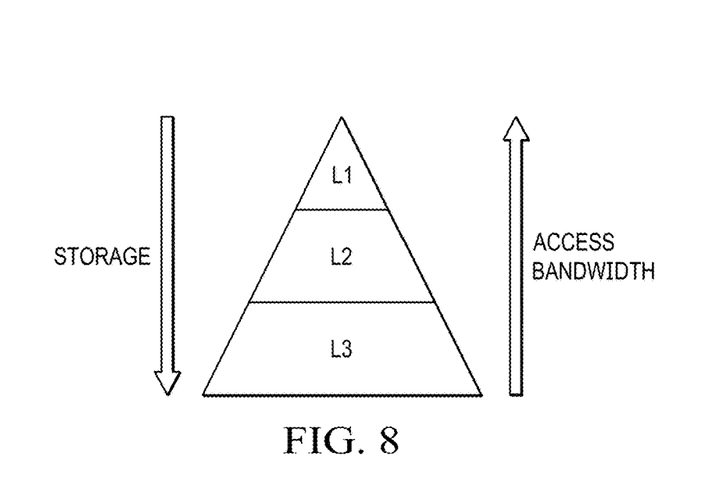
FIG. 8 shows an example data hierarchy to support the optical flow processing of the DOFE.

To optimize access bandwidth to data needed for the correspondence searches, a hierarchical data organization is used. As illustrated in FIG. 8, in some embodiments, the data hierarchy includes three levels of memory in which the amount of storage progressively decreases from level 3 (L3) to level 1 (L1) while the access bandwidth progressively increases. The L3 memory may be external to the optical flow accelerator 312, e.g., the on-chip RAM 316, while the L2 memory and the L1 memory are included in the optical flow accelerator 312 as the shared memory 412 and the search range buffer 708, respectively.

In this hierarchy, the L3 memory stores the reference and query images, the L2 memory stores a subset of concurrent pixel rows of each of the images, and the L1 memory stores a search window extracted from the reference image rows in the L2 memory. Further, the subsets of the reference image and the query image in the L2 memory may be maintained according to a growing window approach in which a circular buffer of consecutive image rows read from the L3 memory is maintained for each image in parallel with the optical flow processing. The number of rows in each of the circular buffers may be any suitable number. In some embodiments, the minimum number of rows in a growing window may be based on the number of pixels needed for the census transforms and the number of pixels needed for computing the Hamming distance as well as the vertical search range. In some embodiments, image rows are fetched from the L3 memory in paxel rows, e.g., if a paxel is 2×2, two rows are fetched.

Figure 9:
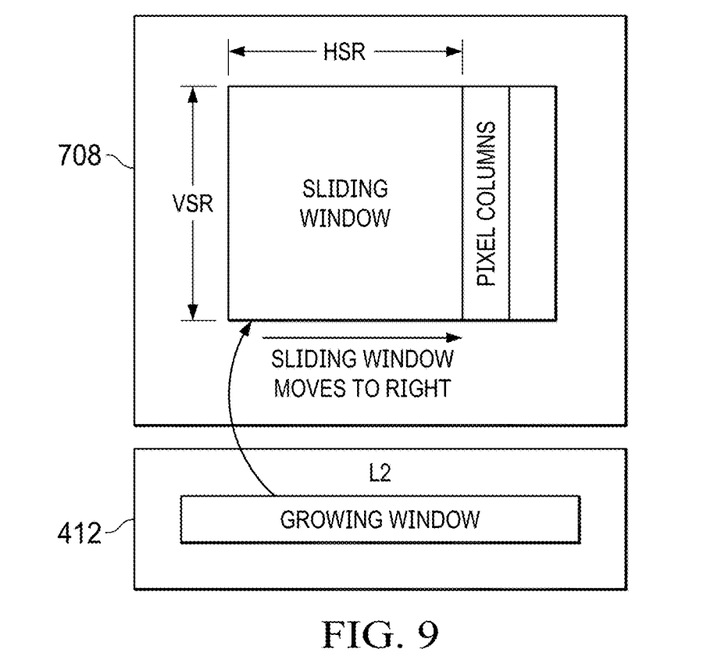
FIG. 9 shows an example sliding search window used in the optical flow processing of the DOFE.

As depicted in FIG. 9, the search window in the L1 memory, e.g., the search range buffer 708, may be maintained according to a sliding window approach in which a circular buffer of consecutive columns of pixel tiles read from the reference image growing window is maintained in parallel with the optical flow processing. As paxel processing moves right in raster scan order, new columns of pixel tiles are added while the same number of pixel tile columns is discarded. The size of the sliding window may be based on the search range for the correspondence matching.

Referring back to FIG. 7, the shared memory interface 712 is further configured to read pixel data for the reference frame from the growing window in the shared memory 712 via the shared memory interconnect 410. The pixel data is provided to the line to block conversion component 710 for processing and storage in the search range buffer 708. The line to block conversion component 710 is configured to convert the pixel data read from the shared memory 412 into pixel tiles for storage in the search range buffer 708. Any suitable pixel data size and pixel tile size may be used.

Figure 10:
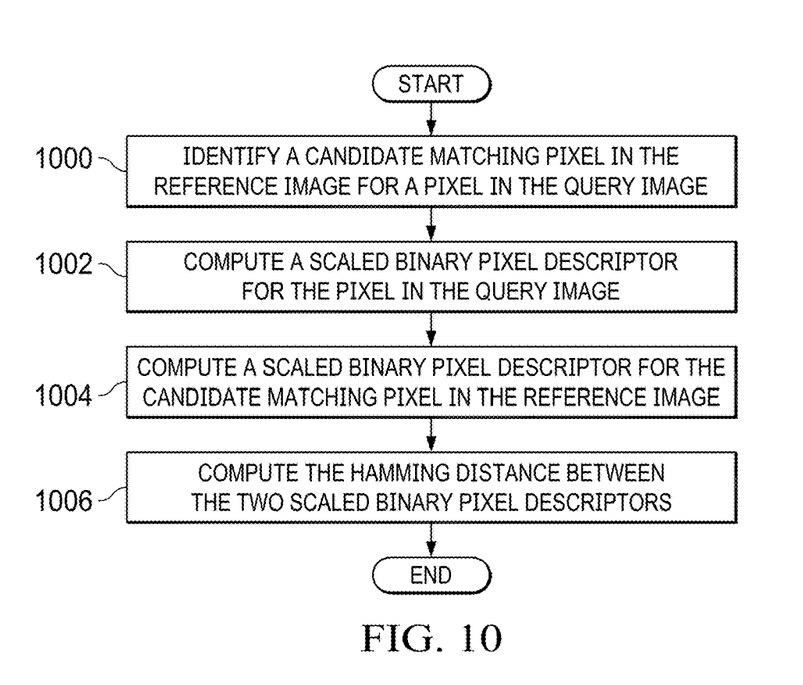
FIG. 10, FIG. 11, and FIG. 12 are flow diagrams of methods for determining a matching cost in optical flow processing.

FIG. 10 is a flow diagram of a method for determining a matching cost in optical flow processing. Initially, a candidate matching pixel in the reference image is identified 1000 for a pixel in the query image. Identification of matching pixels is previously described herein. A scaled binary pixel descriptor is computed 1002 for the pixel in the query image. Computation of the scaled binary pixel descriptor for a pixel in a query image is previously described herein. A scaled binary pixel descriptor is also computed 1004 for the candidate matching pixel in the reference image. Computation of the scaled binary pixel descriptor for a pixel in a reference image is previously described herein. The matching cost is then computed 1006 as the Hamming distance between the two scaled binary pixel descriptors. Computation of Hamming distance is previously described herein.

Figure 11:
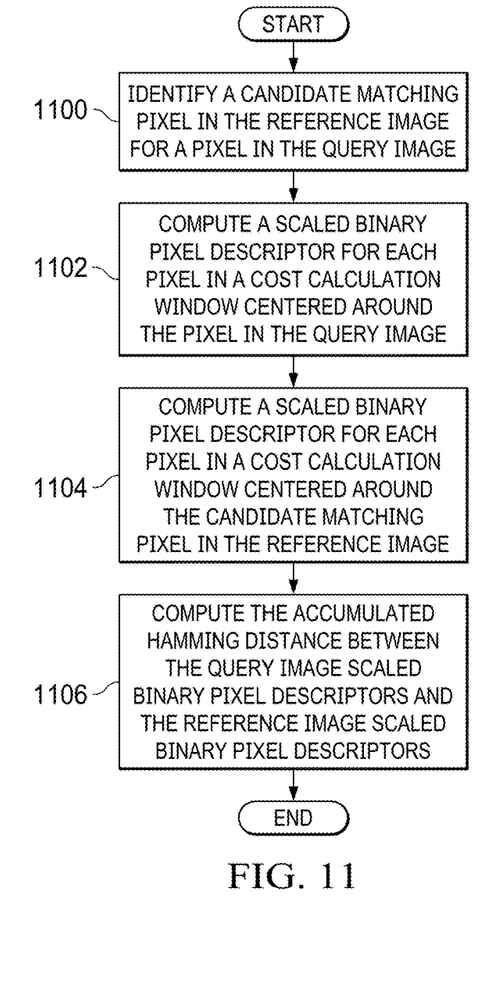

FIG. 11 is a flow diagram of a method for determining a matching cost in optical flow processing. Initially, a candidate matching pixel in the reference image is identified 1100 for a pixel in the query image. Identification of matching pixels is previously described herein. A scaled binary pixel descriptor is computed 1102 for each pixel in a cost calculation window centered around the pixel in the query image. Computation of scaled binary pixel descriptors for pixels in a cost calculation window in a query image is previously described herein. A scaled binary pixel descriptor is also computed 1104 for each pixel in a cost calculation window centered around the candidate matching pixel in the reference image. Computation of scaled binary pixel descriptors for pixels in a cost calculation window in a reference image is previously described herein. The matching cost is then computed 1106 as the accumulated Hamming distance between the query image scaled binary pixel descriptors and the reference image scaled binary pixel descriptors. Computation of accumulated Hamming distance is previously described herein.

Figure 12:
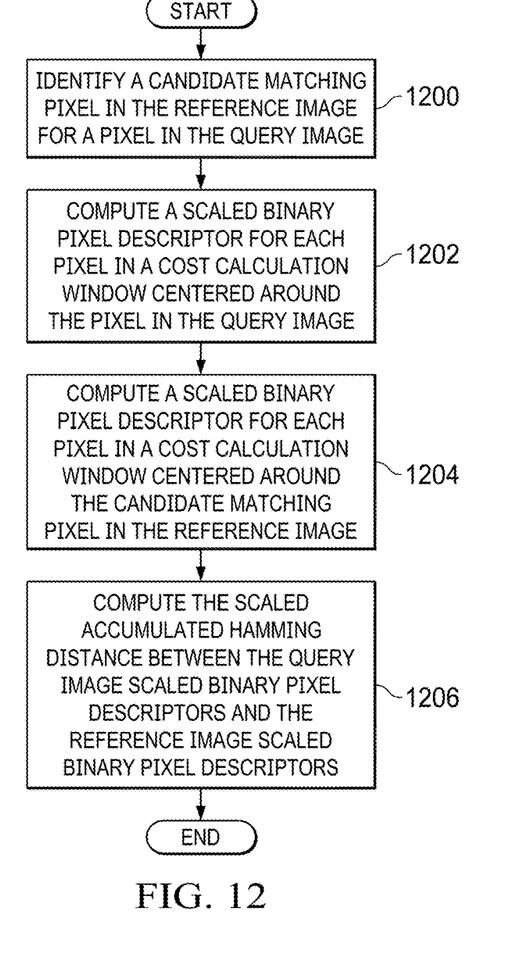

FIG. 12 is a flow diagram of a method for determining a matching cost in optical flow processing. Initially, a candidate matching pixel in the reference image is identified 1200 for a pixel in the query image. Identification of matching pixels is previously described herein. A scaled binary pixel descriptor is computed 1202 for each pixel in a cost calculation window centered around the pixel in the query image. Computation of scaled binary pixel descriptors for pixels in a cost calculation window in a query image is previously described herein. A scaled binary pixel descriptor is also computed 1204 for each pixel in a cost calculation window centered around the candidate matching pixel in the reference image. Computation of scaled binary pixel descriptors for pixels in a cost calculation window in a reference image is previously described herein. The matching cost is then computed 1206 as the scaled accumulated Hamming distance between the query image scaled binary pixel descriptors and the reference image scaled binary pixel descriptors. Computation of scaled accumulated Hamming distance is previously described herein.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in reference to ADAS. One of ordinary skill in the art will understand embodiments for applications other than ADAS that rely on optical flow, such as, for example, industrial applications, robotics, and drones.

In another example, embodiments have been described herein in which the anchor pixel of a paxel is assumed to be the top left pixel. One of ordinary skill in the art will understand embodiments in which the anchor pixel may be another pixel in the paxel.

In another example, embodiments have been described herein in which predictor based searches and step searches are used to identify the best matching pixels in the reference image. One of ordinary skill in the art will understand embodiments in which other types of searches are used.

In another example, embodiments have been described herein assuming a paxel based search for matching pixels in the reference image. One of ordinary skill in the art will understand embodiments in which the search is not paxel based but rather searches for each pixel in the query image.

In another example, embodiments have been described assuming two dimensional (2D) correspondence matching. One of ordinary skill in the art will understand embodiments for three dimensional (3D) correspondence matching in which voxels are matched between a query volume and a reference volume. That is, given two volumes, the problem is to find the best matching position of a voxel in the query volume in the reference volume. In general, the search for the best matching voxel is performed within a predetermined region, referred to as the search range. The search pattern within a volume can be exhaustive or in hierarchical patterns which sequentially look for the best matching voxel around the prior best match. The search can also be guided by the already matched correspondences for neighboring voxels.

The approach of using census transforms as pixel descriptors and Hamming distance to assess pixel matches can be extended to voxel matching where the binary pixel descriptors are generated using a binary census transform defined over a 3D neighborhood around the voxel and a 3D window around the voxel is used to calculate matching cost. Table 3 and Table 4 show examples of 3D offset locations of voxels that can be used to define 'scaled' census transforms with two scales and twelve bit binary descriptors for query and reference voxels respectively.

TABLE 3

| Bit order($a$) | 3D offset locations p for neighboring voxels used in 2-scale Census Transform for query voxel | |
|---|---|---|
| | $p_{a,1}^q$ ($s_1 = 1$) | $p_{a,2}^q$ ($s_2 = 2$) |
| 1 | −1, 0, 0 | −1, 0, 0 |
| 2 | 0, −1, 0 | 0, −1, 0 |
| 3 | 0, 0, −1 | 0, 0, −1 |
| 4 | 1, 0, 0 | 1, 0, 0 |
| 5 | 0, 1, 0 | 0, 1, 0 |
| 6 | 0, 0, 1 | 0, 0, 1 |

TABLE 4

| Bit order($a$) | 3D offset locations p for neighboring voxels used in 2-scale Census Transform for reference voxel | |
|---|---|---|
| | $p_{a,1}^q$ ($s_1 = 1$) | $p_{a,2}^q$ ($s_2 = 2$) |
| 1 | −1, 0, 0 | −2, 0, 0 |
| 2 | 0, −1, 0 | 0, −2, 0 |
| 3 | 0, 0, −1 | 0, 0, −2 |
| 4 | 1, 0, 0 | 2, 0, 0 |
| 5 | 0, 1, 0 | 0, 2, 0 |
| 6 | 0, 0, 1 | 0, 0, 2 |

In another example, embodiments have been described herein in which the modified accumulated Hamming distance is computed based on scaled binary pixel descriptors. One of ordinary skill in the art will understand embodiments in which the modified accumulated Hamming distance is computed based on binary pixel descriptors computed using a prior art binary census transform. In such embodiments, any suitable number of scaling ratios and size of the cost calculation window may be used.

In another example, one of ordinary skill in the art will understand that the conventional sum-of-absolute-distances (SAD) based cost function used in searching for a best matching pixel can be modified to account for perspective magnification as given by $$SAD = \sum_{i=1}^{m} \sum_{j=1}^{n_i} |I^q((x_q, y_q) + p_{j,i}) - I^r((x_r, y_r) + s_i \times p_{j,i})|$$

where $I^q$ and $I^r$ are, respectively, the query image and the reference image, m is the number of scaling ratios, $n_i$ is the number of pixels in the neighborhood corresponding to the ith scaling ratio, $s_i$ is the ith scaling ratio, and $p_{j,i}$ is the relative position of the jth pixel in the neighborhood corresponding to the ith scaling ratio in the query image.

In another example, embodiments have been described herein in which optical flow is computed for temporally consecutive images from a single camera. One of ordinary skill in the art will understand embodiments in which optical flow is computed for pairs of temporally consecutive images from more than one camera.

In another example, embodiments have been described herein in which the query and reference images are captured by a camera. One of ordinary skill in the art will understand embodiments in which another image generation device may be used to generate the query and reference images. For example, a graphics processor may generate consecutive synthetic images of a scene, e.g., for gaming or virtual reality applications.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A system comprising:
 a pixel match engine configured to:
  identify a candidate matching pixel in a reference image for a pixel in a query image; and
  determine a matching cost for the candidate matching pixel based on a first pixel descriptor for the pixel and a second pixel descriptor for the candidate matching pixel; and
 a census transform engine configured to determine the first pixel descriptor and the second pixel descriptor, wherein to determine the first pixel descriptor, the census transform engine is configured to:
  determine a first descriptor for the pixel, in which the determination of the first descriptor comprises a census transform of first neighborhood pixels in the query image;
  determine a second descriptor for the pixel, in which the determination of the second descriptor comprises a census transform of second neighborhood pixels in the query image; and
  determine the first pixel descriptor based in part on the first descriptor and the second descriptor; and
 to determine the second pixel descriptor, the census transform engine is configured to:
  determine a third descriptor for the candidate matching pixel, in which the determination of the third descriptor comprises a binary census transform of third neighborhood pixels in the reference image;
  determine a fourth descriptor for the candidate matching pixel, in which the determination of the fourth descriptor comprises a binary census transform of fourth neighborhood pixels in the reference image; and
  determine the second pixel descriptor based in part on the third descriptor and the fourth descriptor.

2. The system of claim 1, wherein the first neighborhood pixels and the second neighborhood pixels are comprised in a 5×5 pixel neighborhood and the third neighborhood pixels and the fourth neighborhood pixels are comprised in a 7×7 pixel neighborhood.

3. The system of claim 1, wherein the pixel match search engine is further configured to determine the matching cost as a Hamming distance of the first pixel descriptor and the second pixel descriptor.

4. The system of claim 1, wherein the pixel match search engine is further configured to determine the matching cost as an accumulated Hamming distance of a first accumulated binary pixel descriptor for the pixel comprising the first pixel descriptor and a second accumulated binary pixel descriptor for the candidate matching pixel comprising the second pixel descriptor, wherein the first accumulated binary pixel descriptor comprises pixel descriptors for pixels in a cost calculation window centered on the pixel and the second accumulated binary pixel descriptor comprises pixel descriptors for pixels in the cost calculation window centered on the candidate matching pixel.

5. The system of claim 1, wherein the pixel match engine is further configured to determine the matching cost as a scaled accumulated Hamming distance between pixel descriptors for pixels in a cost calculation window centered on the pixel and pixel descriptors for pixels in the cost calculation window centered on the candidate matching pixel, wherein the scaled accumulated Hamming distance is determined as per $$HD = \sum_{i=1}^{f} \sum_{j=1}^{g_i} \text{bitcount}\,(B^q((x_q, y_q) + p_{j,i}) \oplus B^r((x_r, y_r) + s_{Hi} \times p_{j,i}))$$

wherein $B^q$ is pixel descriptor in the query image, $B^r$ is pixel descriptor in the reference image, $S_H = [s_{H1}, s_{H2}, \ldots, s_{Hf}]$ is a set of f discrete scaling ratios, $N_k^{Hq} = [p_{1,k}, p_{2,k}, \ldots, p_{g,k}]$ is g pixels in the cost calculation window of the query image for the $f^{th}$ scaling ratio, $p_{a,k}$ is the relative position of an $a^{th}$ pixel in the cost calculation window of the query image with respect to the pixel, $\oplus$ is a bitwise exclusive-or operation, and bitcount calculates a number of bits set to one after the bitwise exclusive-or operation.

6. The system of claim 1, wherein the system is comprised in a driver assistance system.

7. The system of claim 1, wherein the system is comprised in a hardware optical flow accelerator.

8. A method comprising:
identifying a candidate matching pixel in a reference image for a pixel in a query image;
determining a first descriptor for the pixel based in part on a binary census transform of first neighborhood pixels in the query image;
determining a second descriptor for the pixel based in prt on the binary census transform of second neighborhood pixels in the query image;
determining a first pixel descriptor based in part on the first descriptor and the second descriptor;
determining a third descriptor for the candidate matching pixel based in part on a binary census transform of third neighborhood pixels in the reference image;
determining a fourth descriptor for the candidate matching pixel based in part on a binary census transform of fourth neighborhood pixels in the reference image;
determining a second pixel descriptor based in part on the third descriptor and the fourth descriptor; and
determining a matching cost of the candidate matching pixel based on the first pixel descriptor and the second pixel descriptor.

9. The method of claim 8, wherein the first neighborhood pixels and the second neighborhood pixels are comprised in a 5×5 pixel neighborhood and the third neighborhood pixels and the fourth neighborhood pixels are comprised in a 7×7 pixel neighborhood.

10. The method of claim 8, wherein determining a matching cost further comprises determining the matching cost as a Hamming distance of the first pixel descriptor and the second pixel descriptor.

11. The method of claim 8, wherein determining the matching cost further comprises determining the matching cost as an accumulated Hamming distance of a first accumulated binary pixel descriptor for the pixel comprising the first pixel descriptor and a second accumulated binary pixel descriptor for the candidate matching pixel comprising the second pixel descriptor, wherein the first accumulated binary pixel descriptor comprises pixel descriptors for pixels in a cost calculation window centered on the pixel and the second accumulated binary pixel descriptor comprises pixel descriptors for pixels in the cost calculation window centered on the candidate matching pixel.

12. The method of claim 8, wherein determining the matching cost further comprises determining the matching cost as a scaled accumulated Hamming distance between pixel descriptors for pixels in a cost calculation window centered on the pixel and pixel descriptors for pixels in the cost calculation window centered on the candidate matching pixel, wherein the scaled accumulated Hamming distance is determined as per $$HD = \sum_{i=1}^{f} \sum_{j=1}^{g_i} \text{bitcount}\,(B^q((x_q, y_q) + p_{j,i}) \oplus B^r((x_r, y_r) + s_{Hi} \times p_{j,i}))$$

wherein $B^q$ is pixel descriptor in the query image, $B^r$ is pixel descriptor in the reference image, $S_H = [s_{H1}, s_{H2}, \ldots, s_{Hf}]$ is a set of f discrete scaling ratios, $N_k^{Hq} = [p_{1,k}, p_{2,k}, \ldots, p_{g,k}]$ is g pixels in the cost calculation window of the query image for the $f^{th}$ scaling ratio, $p_{a,k}$ is the relative position of an $a^{th}$ pixel in the cost calculation window of the query image with respect to the pixel, $\oplus$ is a bitwise exclusive-or operation, and bitcount calculates a number of bits set to one after the bitwise exclusive-or operation.

13. A method of optical flow estimation, the method comprising:
identifying a candidate matching pixel in a reference image for a pixel in a query image; and
determining a matching cost of the candidate matching pixel based on a first neighborhood of pixels of the pixel and a second neighborhood of pixels of the candidate matching pixel and a set of scaling ratios, wherein relative positions of pixels in the first neighborhood of pixels and relative positions of pixels in the second neighborhood of pixels used in determining the matching cost are selected based on the set of scaling ratios.

14. The method of claim 13, wherein determining a matching cost further comprises:
determining the matching cost as a scaled accumulated Hamming distance between first binary pixel descriptors for the first neighborhood of pixels and second binary pixel descriptors for the second neighborhood of pixels, wherein the scaled accumulated Hamming distance is determined as per $$HD = \sum_{i=1}^{f} \sum_{j=1}^{g_i} \text{bitcount}\,(B^q((x_q, y_q) + p_{j,i}) \oplus B^r((x_r, y_r) + s_{Hi} \times p_{j,i}))$$

wherein $B^q$ is a binary pixel descriptor in the query image, $B^r$ is a binary pixel descriptor in the reference image, the set of scaling ratios is a set of f discrete scaling ratios given by $S_H = [s_{H1}, s_{H2}, \ldots, s_{Hf}]$, $N_k^{Hq} = [p_{1,k}, p_{2,k}, \ldots, p_{g,k}]$ is g pixels in the first neighborhood of pixels for the $f^{th}$ scaling ratio, $p_{a,k}$ is the relative position of an $a^{th}$ pixel in the first neighborhood of pixels with respect to the pixel, $\oplus$ is a bitwise exclusive-or operation, and bitcount calculates a number of bits set to one after the bitwise exclusive-or operation.

15. The method of claim 14, wherein the first binary pixel descriptors and the second binary pixel descriptors are pixel descriptors.

16. The method of claim 13, wherein determining a matching cost further comprises:
determining the matching cost as per a scaled sum-of-absolute-distances (SAD), wherein the scaled SAD is determined as per $$SAD = \sum_{i=1}^{m} \sum_{j=1}^{n_i} |I^q((x_q, y_q) + p_{j,i}) - I^r((x_r, y_r) + s_i \times p_{j,i})|$$

wherein $I^q$ and $I^r$ are, respectively, the query image and the reference image, m is a number of scaling ratios in the set of scaling ratios, $n_i$ is a number of pixels corresponding to an ith scaling ratio, $s_i$ is the ith scaling ratio, and $p_{j,i}$ is a relative position of a jth pixel in the first neighborhood of pixels corresponding to the ith scaling ratio.

17. The method of claim 13, wherein determining a matching cost further comprises:
    determining the matching cost as a Hamming distance of a first pixel descriptor and a second pixel descriptor, wherein the first pixel descriptor is determined based on the first neighborhood of pixels and the second pixel descriptor is determined based on the second neighborhood of pixels.

18. The method of claim 13, wherein determining a matching cost further comprises:
    determining the matching cost as an accumulated Hamming distance of a first accumulated binary pixel descriptor for the pixel and a second accumulated binary pixel descriptor for the candidate matching pixel, wherein the first accumulated binary pixel descriptor comprises pixel descriptors for pixels in the first neighborhood of pixels and the second accumulated binary pixel descriptor comprises pixel descriptors for pixels in the second neighborhood of pixels.

19. The method of claim 13, wherein determining a matching cost further comprises:
    determining the matching cost based on a first pixel descriptor and a second pixel descriptor, wherein the first pixel descriptor comprises binary pixel descriptors determined by a binary census transform in the first neighborhood of pixels and the second pixel comprises binary pixel descriptors determined by the binary census transform in the second neighborhood of pixels.

* * * * *